(12) United States Patent
Yamamoto et al.

(10) Patent No.: US 11,078,086 B2
(45) Date of Patent: Aug. 3, 2021

(54) METHOD FOR PRODUCING LITHIUM HYDROXIDE ANHYDRIDE AND ROTARY KILN TO BE USED THEREFOR

(71) Applicants: BASF TODA BATTERY MATERIALS LLC, Tokyo (JP); TANABE CORPORATION, Itoigawa (JP)

(72) Inventors: Manabu Yamamoto, Sanyoonoda (JP); Osamu Sasaki, Sanyoonoda (JP); Noriyasu Kimura, Sanyoonoda (JP); Kenichi Nishimura, Itoigawa (JP); Wataru Koyanagi, Itoigawa (JP); Toru Kuwahara, Itoigawa (JP)

(73) Assignees: BASF TODA BATTERY MATERIALS LLC, Tokyo (JP); TANABE CORPORATION, Itoigawa (JP)

( * ) Notice: Subject to any disclaimer, the term of this patent is extended or adjusted under 35 U.S.C. 154(b) by 0 days.

(21) Appl. No.: 16/346,319

(22) PCT Filed: Oct. 31, 2017

(86) PCT No.: PCT/JP2017/039280
§ 371 (c)(1),
(2) Date: Apr. 30, 2019

(87) PCT Pub. No.: WO2018/084134
PCT Pub. Date: May 11, 2018

(65) Prior Publication Data
US 2020/0055739 A1   Feb. 20, 2020

(30) Foreign Application Priority Data
Nov. 1, 2016 (JP) .............................. JP2016-214053

(51) Int. Cl.
*C01D 15/02* (2006.01)
*F27B 7/08* (2006.01)
(Continued)

(52) U.S. Cl.
CPC ................ *C01D 15/02* (2013.01); *F27B 7/08* (2013.01); *F27B 7/36* (2013.01); *F27B 7/362* (2013.01);
(Continued)

(58) Field of Classification Search
CPC ... F27B 7/362; F27B 7/08; F27B 7/36; C01D 15/02; F27D 7/06
(Continued)

(56) References Cited

U.S. PATENT DOCUMENTS

| | | |
|---|---|---|
| 2012/0319037 A1 | 12/2012 | Kawahashi et al. |
| 2014/0004473 A1 | 1/2014 | Song et al. |
| 2014/0302399 A1 | 10/2014 | Saimen et al. |

FOREIGN PATENT DOCUMENTS

| | | |
|---|---|---|
| JP | 2000-256010 A | 9/2000 |
| JP | 3735887 B2 | 1/2006 |

(Continued)

OTHER PUBLICATIONS

Extended European Search Report, dated Jul. 15, 2019, for European Application No. 17867657.3.
(Continued)

*Primary Examiner* — Melissa S Swain
(74) *Attorney, Agent, or Firm* — Birch, Stewart, Kolasch & Birch, LLP

(57) ABSTRACT

The object of the present invention is to improve production efficiency of lithium hydroxide anhydride in a method for producing lithium hydroxide anhydride from lithium hydroxide hydrate by using a rotary kiln. The method for producing lithium hydroxide anhydride comprises steps of:
(Continued)

supplying the lithium hydroxide hydrate to a region between a heating part which is the part of the furnace core tube surrounded by the heating furnace and one end of the furnace core tube; delivering the supplied lithium hydroxide hydrate toward the other end of the furnace core tube; feeding a drying gas with a temperature of 100° C. or higher to the region between the one end and the heating part of the furnace core tube, when the lithium hydroxide hydrate is supplied; and heating and dehydrating the lithium hydroxide hydrate by the heating furnace which is set to 230-450° C. during the lithium hydroxide delivering step, to form lithium hydroxide anhydride.

5 Claims, 1 Drawing Sheet

(51) Int. Cl.
*F27B 7/36* (2006.01)
*F27D 7/06* (2006.01)
*H01M 4/48* (2010.01)
*H01M 10/0525* (2010.01)
*H01M 4/02* (2006.01)

(52) U.S. Cl.
CPC .............. *F27D 7/06* (2013.01); *H01M 4/483* (2013.01); *H01M 10/0525* (2013.01); *F27B 2007/365* (2013.01); *H01M 2004/028* (2013.01)

(58) Field of Classification Search
USPC .......................................................... 423/641
See application file for complete search history.

(56) References Cited

FOREIGN PATENT DOCUMENTS

| | | |
|---|---|---|
| JP | 2006-151707 A | 6/2006 |
| JP | 2006-265023 A | 10/2006 |
| JP | 2011-178584 A | 9/2011 |
| JP | 2014-212103 A | 11/2014 |
| JP | 2015-000826 A | 1/2015 |
| WO | WO 2012/108148 A1 | 8/2012 |
| WO | WO-2016117617 A1 * | 7/2016 ......... F27D 99/0006 |

OTHER PUBLICATIONS

European Patent Office Communications pursuant to Article 94(3) EPC issued in the corresponding European Patent Application No. 17867657.3 dated Apr. 7, 2020.
International Search Report (PCT/ISA/210) issued in PCT/JP2017/039280, dated Feb. 6, 2018.
Written Opinion (PCT/ISA/237) issued in PCT/JP2017/039280, dated Feb. 6, 2018.

* cited by examiner

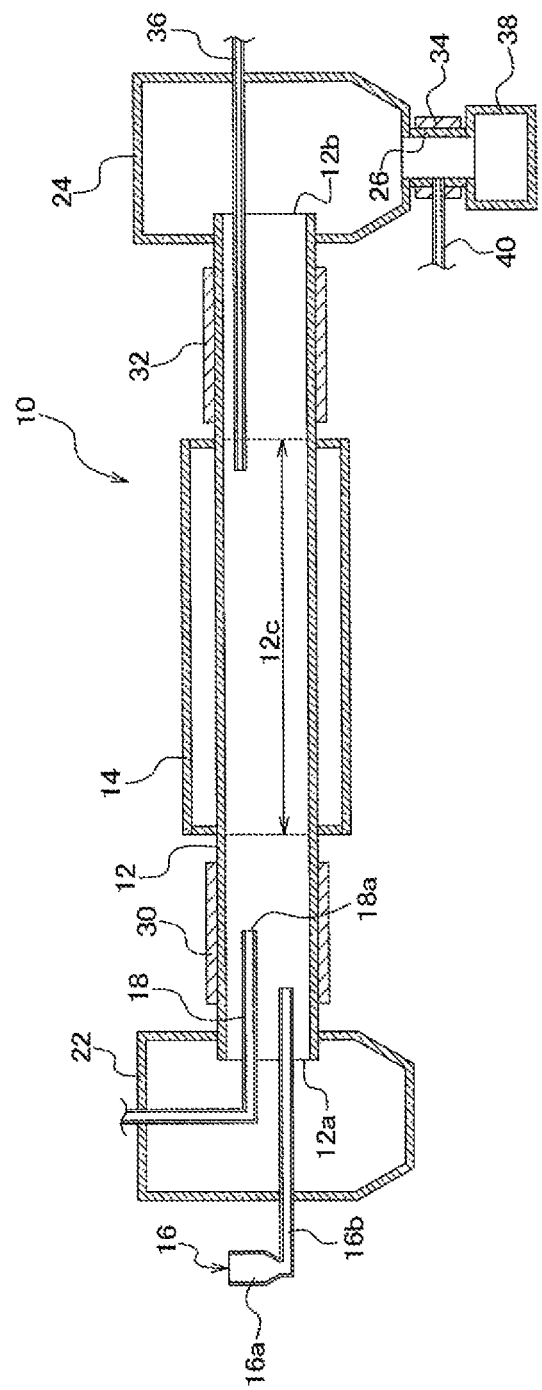

METHOD FOR PRODUCING LITHIUM HYDROXIDE ANHYDRIDE AND ROTARY KILN TO BE USED THEREFOR

TECHNICAL FIELD

The present invention relates to a method for producing lithium hydroxide anhydride. Especially, the present invention relates to a method for producing lithium hydroxide anhydride from lithium hydroxide hydrate by using a rotary kiln, and a rotary kiln for use in this method.

BACKGROUND ART

Lithium hydroxide, which has conventionally been used as raw materials, such as cathode materials for lithium ion batteries, has high hygroscopicity. Usually, it is generally present as lithium hydroxide hydrate ($LiOH \cdot nH_2O$). When lithium hydroxide is used as a raw material to make some products, it may be advantageous to use, as a raw material, lithium hydroxide anhydride, which does not generate water in the course of processing, rather than lithium hydroxide hydrate, which generates a large amount of water. In this case, the treatment of heating the lithium hydroxide hydrate to dehydrate it is carried out as a pretreatment.

Patent Document 1 describes a method for dehydrating lithium hydroxide monohydrate by means of a rotary kiln, which comprises heating the temperature inside the furnace core tube to 150° C. or higher. In this method, lithium hydroxide anhydrate having a small and uniform particle size is obtained, which does not contain massive particles with large particle size.

PRIOR ART DOCUMENTS

Patent Documents

Patent Literature 1: JP 2006-265023 A

SUMMARY OF THE INVENTION

Problem to be Solved by the Invention

However, in the above-mentioned treatment of dehydrating the lithium hydroxide by a rotary kiln, since a part of the lithium hydroxide supplied into the furnace core tube remains in the furnace core tube by, for example, adhering to the furnace core tube or its internal devices, there is a problem that sufficient production efficiency cannot be obtained.

Therefore, an object of the present invention is to improve production efficiency of lithium hydroxide anhydride in a method for producing lithium hydroxide anhydride from lithium hydroxide hydrate by using a rotary kiln.

Means for Solving Problem

The above object could be achieved by a method for producing lithium hydroxide anhydride from lithium hydroxide hydrate by using a rotary kiln which has a furnace core tube and a heating furnace surrounding a certain part of the furnace core tube in the axial direction, wherein the method comprises the steps of:

supplying the lithium hydroxide hydrate to a region between a heating part which is the part of the furnace core tube surrounded by the heating furnace and one end of the furnace core tube;

delivering the supplied lithium hydroxide hydrate toward the other end of the furnace core tube;

feeding a drying gas with a temperature of 100° C. or higher to the region between the one end and the heating part of the furnace core tube, when the lithium hydroxide hydrate is supplied; and heating and dehydrating the lithium hydroxide hydrate by the heating furnace which is set to 230-450° C. during the lithium hydroxide delivering step, to form lithium hydroxide anhydride.

It was considered that the remaining of the lithium hydroxide by adhering to the furnace core tube is caused by a gas containing water vapor which flows back from the outlet side to the inlet side in the furnace core tube. According to the above structure of the present invention, since a drying gas with a temperature of 100° C. or higher is feed to the region between one end of the furnace core tube on the supplying side and the heating part to warm up the furnace core tube itself, the condensation of the gas containing water vapor which may flow back can be prevented, and the backflow of the gas itself can also be restrained. Therefore, it is possible to prevent the lithium hydroxide from adhering and/or remaining inside the furnace core tube.

The preferred aspects of the method of the present invention are as follows.

(1) The amount of the supplied lithium hydroxide hydrate is from 5 to 15% by volume, based on the volume of the furnace core tube.

(2) The time for heating the lithium hydroxide in the heating part of the furnace core tube is from 30 min to 2 hours.

(3) An insulating material is provided on the outside surface of a region between the one end and the heating part of the furnace core tube.

(4) The rotary kiln comprises an exhaust pipe for discharging the heated drying gas to the outside of the furnace core tube, and the method further comprises a step of discharging the heated drying gas to the outside of the furnace core tube via the exhaust pipe.

Moreover, the present invention provides a rotary kiln for use in producing lithium hydroxide anhydride from lithium hydroxide hydrate, having a furnace core tube and a heating furnace surrounding a certain part of the furnace core tube in the axial direction, wherein the rotary kiln comprises:

a supplying unit for supplying the lithium hydroxide hydrate to a region between a heating part which is the part of the furnace core tube surrounded by the heating furnace and one end of the furnace core tube;

a delivering unit for delivering the supplied lithium hydroxide hydrate toward the other end of the furnace core tube;

a feeding unit for feeding a drying gas with a temperature of 100° C. or higher to the region between the one end and the heating part of the furnace core tube, when the lithium hydroxide hydrate is supplied; and a heating and dehydrating unit for heating and dehydrating the lithium hydroxide hydrate by the heating furnace which is set to 230-450° C. during lithium hydroxide delivering step, to form lithium hydroxide anhydride.

The preferred aspects of the rotary kiln of the present invention are as follows.

(1) An insulating material is provided on the outside surface of a region between the one end and the heating part of the furnace core tube.

(2) The rotary kiln comprises an exhaust pipe for discharging the heated drying gas to the outside of the furnace core tube.

Advantageous Effects of the Invention

The present invention makes it possible to prevent lithium hydroxide from adhering and remaining inside the furnace core tube. Therefore, it is possible to improve the production efficiency of the lithium hydroxide anhydrate.

BRIEF DESCRIPTION OF DRAWINGS

FIG. 1 is a schematic cross sectional view showing one example of the rotary kiln of the present invention.

DESCRIPTION OF EMBODIMENTS

Hereinafter, the method of the present invention for producing lithium hydroxide anhydrate will be explained in details, with reference to the FIGURE.

FIG. 1 is a schematic cross sectional view showing one example of a rotary kiln which can be used in the inventive method for producing lithium hydroxide anhydride. As shown in the FIGURE, the rotary kiln 10 comprises a furnace core tube 12 and a heating furnace 14 surrounding a certain part of the furnace core tube 12 in the axial direction, as a basic configuration. An inlet hood 22 is provided at one end 12a side of the furnace core tube 12, and an outlet hood 24 is provided on the other end 12b side.

A feeder 16, is connected with the one end 12a side of the furnace core tube 12, and the feeder 16 has a hopper 16a and a feed pipe 16b. The lithium hydroxide hydrate supplied to the hopper 16a is supplied to a region between the one end 12a and a heating part 12c inside the furnace core tube 12, via the feed pipe 16b (supplying step). A screw (not shown in the FIGURE) for feeding the lithium hydroxide hydrate into the furnace core tube 12 is provided inside the feed pipe 16b, if desired.

When the lithium hydroxide hydrate is supplied into the furnace core tube 12 from the feeder 16, if necessary, a drying gas (nitrogen, decarbonated gas (a gas in which the carbon content of carbon dioxide is from 0.1 to 100 ppm, preferably 1 ppm or less), argon, and etc.) is fed together with the lithium hydroxide hydrate via the feed pipe 16b. The supply amount (filling ratio) of the lithium hydroxide hydrate is from 5 to 15% by volume, preferably from 5 to 12% by volume, based on the volume of the furnace core tube 12. Within this range, remaining and/or backflow inside the furnace core tube 12 can further be prevented, and the dehydration of the lithium hydroxide hydrate can be achieved. The lithium hydroxide hydrate is supplied in the form of powder, and its average particle size is, for example, from 10 to 1000 μm.

The furnace core tube 12 is configured to be rotatable, and is installed to be slightly inclined so that the position of the other end 12b side (outlet side) is lower than that of the one end 12a side (inlet side). In this way, inside the furnace core tube 12, the lithium hydroxide hydrate can be delivered from the one end 12a side to the other end 12b side (lithium hydroxide delivering step). The inclination, without a particularly limitation, can be appropriately set in accordance with various conditions such as desired heating time, and is generally from 1/100 to 3/100.

The rotation rate of the furnace core tube 12 can be appropriately set in accordance with various conditions such as desired heating time, and is generally from 0.1 to 30 rpm. As materials constituting the furnace core tube 12, materials which have improved heat resistance and thermal conductivity, and are inert to lithium hydroxide can be used. Examples include nickel, stainless steel, and ceramics, and nickel is preferably used. The size of the furnace core tube 12 can be appropriately set in accordance with the amount of the lithium hydroxide to be processed. The thickness of the furnace core tube 12 is generally from 4 to 12 mm. A feeding impeller and/or knocker may be disposed between the one end 12a and the heating part 12c of the furnace core tube 12, so that the lithium hydroxide hydrate can be smoothly fed.

The rotary kiln 10 comprises a drying gas feed pipe 18 for feeding the drying gas into the furnace core tube 12. The drying gas feed pipe 18 is provided such that its delivery port 18a is located in a region between the one end 12a and the heating part 12c of the furnace core tube 12. When the lithium hydroxide hydrate is supplied into the furnace core tube 12, the drying gas is fed to the region between the one end 12a and the heating part 12c of the furnace core tube 12 via the drying gas feed pipe 18 (drying gas feeding step). It is advantageous that the drying gas is fed continuously or intermittently, preferably continuously. Preferably, the delivery port 18a of the drying gas feed pipe 18 is at or near the point where the lithium hydroxide hydrate is supplied into the furnace core tube 12. In this way, adherence and remaining of the lithium hydroxide can be certainly prevented.

The drying gas to be used is preferably inert to lithium hydroxide, and is particularly preferably decarbonated gas (a gas in which the carbon content of carbon dioxide is from 0.1 to 100 ppm, preferably 1 ppm or less), nitrogen, and argon.

In the present invention, the drying gas fed through the drying gas feed pipe 18 is at a temperature of 100° C. or higher, and its upper limit is, for example, 460° C. Particularly preferably used is from 170 to 250° C. Setting to this temperature makes it possible to prevent the lithium hydroxide from adhering and hardening inside the furnace core tube 12.

The feed rate of the drying gas may be any rate as long as the desired purpose is achieved, and it is, for example, from 10 to 500 Nl/min, preferably from 100 to 400 Nl/min, more preferably from 200 to 400 Nl/min.

It is preferable to provide an insulating material 30 on the outside surface including the part where the drying gas of the furnace core tube 12 is fed. Temperature reduction of the heated furnace core tube 12 and the inside thereof can be prevent by the drying gas. As the insulating material, polyurethane foam, glass wool, ceramic fiber board and etc. can be used.

A certain part of the outside surface of the entire furnace core tube 12 in the axial direction is surrounded by a heating furnace 14. The width of the heating furnace 14 is shorter than the axial length of the furnace core tube 12, and the heating furnace 14 is disposed in the central part between the one end 12a and the other end 12b of the furnace core tube 12. The lithium hydroxide hydrate supplied into the furnace core tube 12 is heated by the heating furnace 14, during delivered from the one end 12a side to the other end 12b side (heating step).

In the present invention, the preset temperature of the heating furnace 14 is from 230 to 450° C., preferably from 250 to 350° C. If it is lower than this range, the dehydration of the lithium hydroxide hydrate may be insufficient, and if it is higher than this range, the lithium hydroxide may melt.

The heating furnace 14 may be configured as a single temperature adjustable zone as a whole, or may be divided into a plurality of zones in the axial direction of the furnace core tube 12, each of which is independently temperature adjustable. Usually, the heating furnace 14 has single (one) or 2 to 10 zones which are capable of adjusting temperature.

If a heating furnace which has a plurality of independently temperature adjustable zones is used, it is sufficient that the average temperature of each zone is in the above-mentioned temperature range, preferably the temperatures of all zones are in the above-mentioned temperature range. In the heating step, the temperature of the heating part 12c of the furnace core tube 12 is preferably kept in the range of from 140 to 400° C. by the heating of the heating furnace 14.

Generally, the time for heating the lithium hydroxide in the region of the heating part 12c of the furnace core tube 12 (residence time for heating) depends on various conditions such as the preset temperature, and is usually from 30 min to 2 hours. Moreover, the rotary kiln 10 comprise an exhaust pipe 36 for discharging the drying gas heated by the heating to the outside of the furnace core tube 12, and if necessary, an exhausting step for discharging the gas comprising the drying gas in the furnace core tube 12 from the exhaust pipe 36 can be carried out. As shown in the FIGURE, it is preferable to provide an insulating material 32 on the outside surface of a region between the other end 12b and the heating part 12c of the furnace core tube 12. In this way, it is possible to prevent the temperature reduction inside the furnace core tube 12, and accordingly the moisture absorption of the lithium hydroxide anhydride produced can be prevented.

After the dehydration of the lithium hydroxide hydrate is carried out by the above-mentioned heating step, and the lithium hydroxide is passed through the region of the heating part 12c of the furnace core tube 12, the dehydrated lithium hydroxide, i.e., lithium hydroxide anhydride is delivered to the other end 12b of the furnace core tube 12, and then discharged. The lithium hydroxide anhydride is discharged via the discharge pipe 26, and kept in a container 38 provided below the outlet hood 24. In order to prevent the moisture absorption (hydration) of the lithium hydroxide anhydride produced, during the operation of the rotary kiln 10, preferably a drying gas with a temperature of 150 to 300° C. (it is possible to use the same drying gas as described above) is continuously or intermittently supplied via a drying gas feed pipe 40 connected to the discharge pipe 26. As shown in the FIGURE, it is preferable to provide an insulating material 34 on the outside surface of the discharge pipe 26. In this way, the moisture absorption of the lithium hydroxide anhydride produced can be prevented.

According to the present invention, since a drying gas with a temperature of 100° C. or higher is feed to the region between one end of the furnace core tube on the supplying side and the heating part to warm up the furnace core tube itself, the condensation of the gas containing water vapor which may flow back can be prevented. Therefore, it is possible to prevent the lithium hydroxide from adhering and remaining inside the furnace core tube. In this way, a method for producing the lithium hydroxide anhydride which is improved in production efficiency can be provided. Hereinafter, the present invention will be illustrated by the examples.

EXAMPLES

Lithium hydroxide anhydrate was produced by using the rotary kiln 10 shown in FIG. 1. Specifically, lithium hydroxide hydrate powder (average particle size: 400 μm) was supplied to the hopper 16a in the vicinity of one end 12a of the furnace core tube 12 at a supply amount shown in Table 1. A decarbonated gas with the temperature shown in Table 1 was fed from the drying gas feed pipe 18 to the region between the one end 12a and the heating part 12c of the furnace core tube 12. The decarbonated gas was continuously fed from the start to the end of supplying the lithium hydroxide hydrate into the furnace core tube 12.

Moreover, a heating furnace 14 having five independent temperature adjustable zones (Zone 1 to Zone 5 (arranged in order from the one end 12a of the furnace core tube)) was set to the temperature shown in Table 1, and the supplied lithium hydroxide hydrate was heated and dehydrated. The lithium hydroxide anhydride produced in this way was discharged from other end 12b of the furnace core tube 12, and kept in the container 38. Here, in order to prevent the moisture absorption (hydration) of the lithium hydroxide anhydride produced, during the operation of the rotary kiln, a decarbonated gas with a temperature of 200° C. was continuously supplied via the drying gas feed pipe 40 connected to the discharge pipe 26.

The length in the axial direction of the furnace core tube of the rotary kiln used was 4830 mm. The width of the heating furnace (length in the axial direction of the furnace core tube) was 1800 mm (each of the Zone 1 to Zone 5 has a width of 360 mm) The diameter of the furnace core tube was 300 mm. The volume of the furnace core tube was 0.341 $m^3$. The inclination of the furnace core tube was 1/100. The material of the furnace core tube was LCNi (low-carbon nickel: the content of nickel is 99% by weight or more). The thickness of the furnace core tube was 6 mm. The result is shown in the table below.

TABLE 1

| | | Comparative Example 1 | Comparative Example 2 | Example 1 | Example 2 | Example 3 | Example 4 |
|---|---|---|---|---|---|---|---|
| Supply rate of the lithium hydroxide hydrate (kg/hr) | | 6.8 | 6.8 | 6.8 | 10.2 | 10.2 | 6.8 |
| Residence time for heating (hr) | | unmeasurable | unmeasurable | 1.1 | 1.1 | 0.8 | 1.1 |
| Filling ratio (% by volume) | | unmeasurable | unmeasurable | 7.4 | 11 | 8 | 7.5 |
| Residence time in the entire furnace core tube (hr) | | unmeasurable | unmeasurable | 3 | 2.9 | 2.2 | 3 |
| Temperature of the drying gas (° C.) | | room temperature | room temperature | 200 | 200 | 200 | 200 |
| Feed rate of the drying gas (Nl/min) | | 225 195 after 2 h | 275 | 275 | 275 | 275 | 275 |
| Preset temperature of the heating furnace (° C.) | Zone 1 | 100 | 20 | 350 | 350 | 350 | 250 |
| | Zone 2 | 200 | 20 | 350 | 350 | 350 | 250 |
| | Zone 3 | 300 | 100 | 350 | 350 | 350 | 250 |
| | Zone 4 | 350 | 200 300 after 3 h | 350 | 350 | 350 | 250 |
| | Zone 5 | 350 | 250 300 after 3 h | 350 | 350 | 350 | 250 |
| Temperature of the furnace core tube | Zone 1 | 148 | 113 | 218 | 216 | 207 | 149 |
| | Zone 2 | 161 | 108 | 273 | 287 | 271 | 190 |

TABLE 1-continued

|  |  | Comparative Example 1 | Comparative Example 2 | Example 1 | Example 2 | Example 3 | Example 4 |
| --- | --- | --- | --- | --- | --- | --- | --- |
| (° C.) | Zone 3 | 240 | 152 | 305 | 286 | 270 | 187 |
|  | Zone 4 | 262 | 191 | 308 | 296 | 292 | 197 |
|  | Zone 5 | 276 | 251 | 315 | 307 | 297 | 194 |
| Adherence in the region from LiOH hydrate supply point in the furnace core tube to the heating part | | yes | yes | no | no | no | no (deposition present) |
| Adherence in the outlet hood | | no | yes | no | no | no | no |
| Purity of LiOH | | 100 | 67 | 100 | 100 | 99.8 | 99.8 |

As shown in the table, in Comparative Examples 1 and 2 in which the decarbonated gas supplied into the furnace core tube was at room temperature, remaining inside the furnace core tube was observed. On the other hand, in Examples 1 to 4 in which the temperature of the decarbonated gas supplied into the furnace core tube was 200° C., no remaining inside the furnace core tube was observed. It has been found that the purity of LiOH was higher in Examples 1 to 4. Here, the residence time for heating, the filling ratio, and the residence time in the entire furnace core tube in Comparative Examples 1 and 2 cannot be measured, because the rotary kiln was not able to be operated well.

REFERENCE SIGNS LIST

10 Rotary kiln
12 Furnace core tube
14 Heating furnace
16 Feeder
16a Hopper
16b Feed pipe
18 Drying gas feed pipe
22 Inlet hood
24 Outlet hood
26 Discharge pipe
30, 32, 34 Insulating material
36 Exhaust pipe
38 Container

What is claimed is:

1. A method for producing lithium hydroxide anhydride from lithium hydroxide hydrate by using a rotary kiln which has a furnace core tube and a heating furnace surrounding a certain part of the furnace core tube in the axial direction, wherein the method comprises the steps of:
   supplying the lithium hydroxide hydrate to a region between a heating part which is the part of the furnace core tube surrounded by the heating furnace and one end of the furnace core tube;
   delivering the supplied lithium hydroxide hydrate toward the other end of the furnace core tube;
   feeding a drying gas with a temperature of 100° C. or higher to the region between the one end and the heating part of the furnace core tube, when the lithium hydroxide hydrate is supplied; and
   heating and dehydrating the lithium hydroxide hydrate by the heating furnace which is set to 230-450° C. during the lithium hydroxide delivering step, to form lithium hydroxide anhydride.

2. The method according to claim 1, wherein the amount of the supplied lithium hydroxide hydrate is from 5 to 15% by volume, based on the volume of the furnace core tube.

3. The method according to claim 1, wherein the time for heating the lithium hydroxide in the heating part of the furnace core tube is from 30 min to 2 hours.

4. The method according to claim 1, wherein an insulating material is provided on the outside surface of a region between the one end and the heating part of the furnace core tube.

5. The method according to claim 1, wherein the rotary kiln comprises an exhaust pipe for discharging the heated drying gas to the outside of the furnace core tube,
   wherein the method further comprises a step of discharging the heated drying gas to the outside of the furnace core tube via the exhaust pipe.

* * * * *